United States Patent [19]

Kimura et al.

[11] Patent Number: 5,038,823
[45] Date of Patent: Aug. 13, 1991

[54] DEVICE FOR PREVENTING WATER HAMMER WHILE REGULATING WATER PRESSURE

[75] Inventors: Yasuhide Kimura; Takeshi Motohashi; Yukihiro Fujishima, all of Kitakyushu, Japan

[73] Assignee: Toto Ltd., Fukuoka, Japan

[21] Appl. No.: 442,091

[22] Filed: Nov. 28, 1989

[30] Foreign Application Priority Data

Nov. 30, 1988 [JP] Japan .............. 63-156726[U]
Nov. 30, 1988 [JP] Japan ................. 63-305005

[51] Int. Cl.⁵ .................................... G05D 16/10
[52] U.S. Cl. ........................... 137/505.18; 137/606
[58] Field of Search .............. 137/505, 505.11, 505.14, 137/606, 505.18

[56] References Cited

U.S. PATENT DOCUMENTS

| | | | |
|---|---|---|---|
| 2,212,626 | 8/1940 | Thomas | 137/116.5 |
| 4,055,198 | 10/1977 | Iannelli | 137/116.5 |
| 4,667,693 | 5/1987 | Lacour | 137/116.5 X |
| 4,790,414 | 12/1988 | Harrison | 137/505.14 X |

FOREIGN PATENT DOCUMENTS

| | | |
|---|---|---|
| 59-49481 | 5/1981 | Japan . |
| 56-24146 | 6/1981 | Japan . |
| 59-42191 | 10/1984 | Japan . |
| 63-84894 | 6/1985 | Japan . |
| 60-127173 | 8/1985 | Japan . |
| 63-96365 | 4/1988 | Japan . |
| 1462265 | 2/1989 | U.S.S.R. ............. 137/116.5 |

*Primary Examiner*—Stephen M. Hepperle
*Attorney, Agent, or Firm*—Jordan and Hamburg

[57] ABSTRACT

Device for preventing water hammer while regulating water pressure includes valve element biasing means which substantially consists of a pressure adjusting spring with a small spring constant and a water hammer preventing spring with a large spring constant which are disposed in series in a valve casing. The valve element biasing means is capable of varying the opening area of a communicating passage between an upstream passage and a downstream passage to as to adjust the pressure in the communicating passage while preventing the occurrence of water hammer in piping water supply equipment.

28 Claims, 17 Drawing Sheets

DEVICE FOR PREVENTING WATER HAMMER WHILE REGULATING WATER PRESSURE

BACKGROUND OF THE INVENTION

This invention relates to a device for preventing water hammer which tends to occur in various types of water piping and/or water supply equipment.

Conventionally, there have been several types of devices for preventing water hammer which causes annoying sounds in the piping and water leakage. In one type of valve, a sharp pressure change produced by water hammer is absorbed by a valve element provided with a spring or a shock absorber.

However, in these conventional devices for preventing water hammer, since the retracting volume of the valve element is proportional to a flow-in side passage pressure or an upstream side pressure, corresponding to the pressure change in the flow-in side, the neutral position is remarkably changed. Furthermore, to absorb the sharp rise caused by the water hammer, the valve element must be retracted so as to move beyond the neutral position so that the volume displaced by valve movement (hereinafter "valve movement volume") is increased, making the entire construction of the water hammer preventing device large sized.

Still furthermore, since the water hammer preventing device is devised for preventing exclusively water hammer, the device is not provided with a pressure adjusting function, namely, a function to hold the dynamic fluid pressure in the downstream passage of the device at constant pressure in normal operation.

Accordingly, it is an object of the present invention to provide a device for preventing water hammer which can resolve the above-mentioned tasks.

SUMMARY OF THE INVENTION

This invention provides a device for preventing water hammer which also has a pressure adjusting function comprising a) a communicating passage formed in a valve casing to communicate between an upstream passage and a downstream passage, b) a valve element being reciprocable to open or close the communicating passage, c) a valve element biasing means biasing the valve element in an opening direction, said valve element biasing means reciprocating the valve element substantially only in response to a downstream-side valve pressing pressure which occurs in the downstream passage, the valve element biasing means capable of varying the opening area of the communicating passage so as to adjust the pressure in the communicating passage, and the valve element biasing means comprising a pressure adjusting spring with a small spring constant and a water hammer preventing spring with a large spring constant which are disposed in series at the rear portion of the valve casing.

The device for preventing water hammer is also characterized by being provided with an auxiliary passage capable of conducting out an amount of water, which corresponds to a valve movement volume, from the upstream passage to the downstream passage corresponding to the movement of the valve element in closing direction at the time of the occurrence of water hammer.

Due to the above construction, the invention has following advantages.

① When water hammer is about to occur, the valve element pressing pressure on the downstream passage increases to produce a force on the valve element far greater than the biasing force of the valve element biasing means and the valve element is rapidly moved in a valve closing direction. In this movement of the valve element, the water hammer preventing spring having a large spring constant can effectively absorb the pressure energy that water hammer holds. Accordingly, the occurrence of annoying sound or water leakage in various piping or equipment can be effectively prevented.

② In normal operation, when the pressure in the downstream passage slightly deviates or changes, the pressure adjusting spring having a small spring constant contracts in proportion to the deviation or change of the pressure. Due to this contraction, the valve element is moved in a valve closing direction so as to accurately adjust the downstream pressure to be always constant.

③ When water hammer occurs, causing movement of the valve element in a valve closing direction, an amount of water which corresponds to the valve movement volume flows from the upstream passage to the downstream passage by way of the auxiliary passage so that the valve element is readily and smoothly moved. Accordingly, the pressure energy produced by the water hammer can be readily absorbed whereby the occurrence of annoying sound or water leakage in various piping or equipment can be more effectively prevented.

④ The valve element is always biased in a valve closing direction by means of the valve element biasing means and the valve element biasing means is constructed such that it reciprocates the valve element substantially only along with the downstream valve pressing pressure produced in the downstream passage so as to effect the pressure regulation by changing the opening area of the communication passage. Therefore, the influence of the upstream pressure produced in the upstream passage can be prevented or minimized. Accordingly, the valve movement volume can be minimized and the device for preventing water hammer can be made considerably compact.

DETAILED DESCRIPTION OF PREFERRED EMBODIMENTS OF THE INVENTION

This invention is explained in detail in view of following embodiments in conjunction with the attached drawings.

First Embodiment

Figure 1:
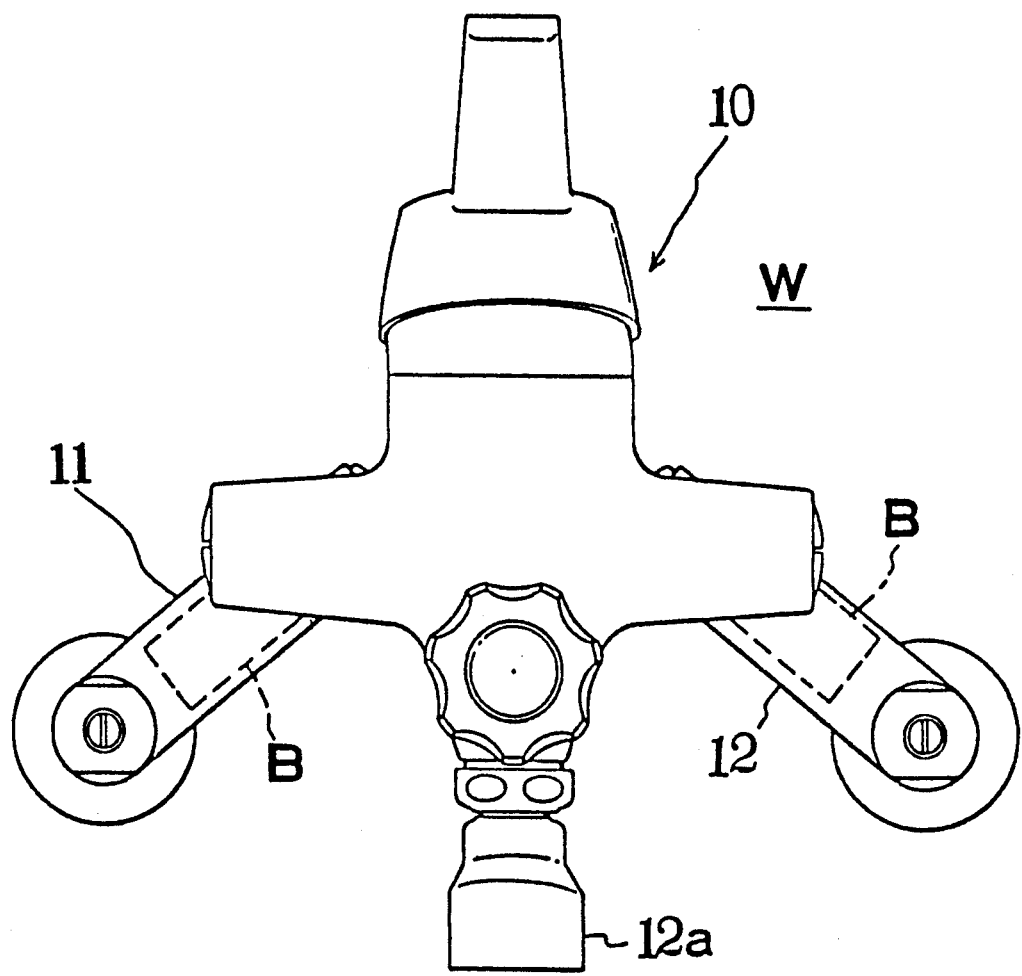
FIG. 1 is a front elevational view of a water mixing valve provided with a water hammer preventing device of a first embodiment having the water pressure regulating function.

In FIG. 1, numeral 10 indicates a mixing valve mounted on a wall W of a bathroom for mixing cold water and hot water. The mixing valve 10 is provided with a cold water supply passage and a hot water supply passage at respective sides thereof and a cold water supply tube 11 and a hot-water supply tube 12 which are inclined upwardly toward the mixing valve 10 are connected to these passages. In the drawing, numeral 12a indicates a spout.

In this embodiment, water hammer preventing devices B are accommodated in the cold water supply tube 11 and the hot water supply tube respectively. The place where the water hammer preventing device B is to be mounted may not necessarily be restricted to the above-mentioned places, but, rather the device B can be mounted on any other places, for example, in the mixing valve 10 or in a water shutoff valve as described later.

The construction of the water hammer preventing device B is explained hereinafter in view of FIG. 2 and FIG. 3 which schematically show the device.

Since the construction of the mixing valve 10 per se is well known, an explanation thereof is omitted.

Figure 2:
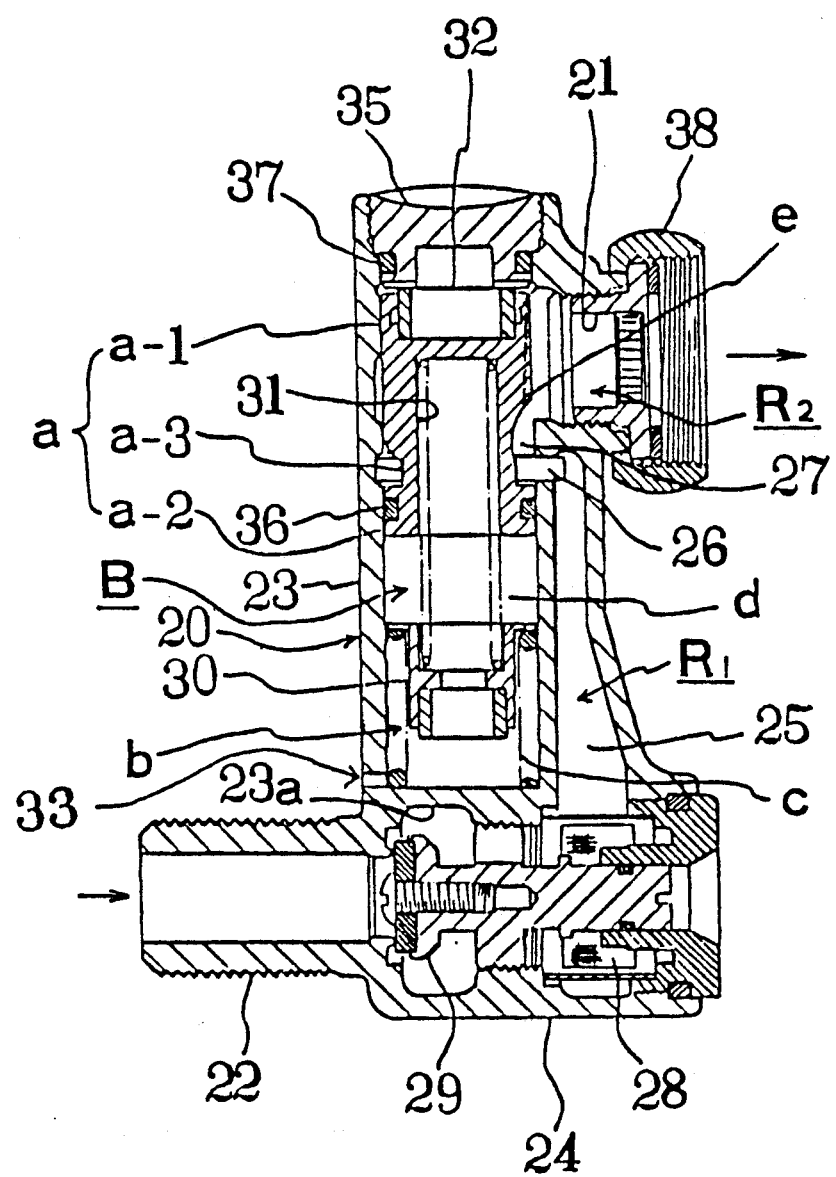
FIG. 2 is a cross sectional view showing the inner structure of the water hammer preventing device.

In FIG. 2, numeral 20 indicates a tubular water supply body which inclines upwardly toward the mixing valve 10. The water supply tube body 20 is provided with an opening 21 at the upper peripheral wall thereof which communicates with either the cold water supply or the hot water supply passage of the mixing valve 10, and is also provided with a cylindrical connecting portion 22 at the lower peripheral wall which communicates with either the cold water supply tube 11 or the hot water supply tube 12.

The water supply body 20 essentially consists of a water hammer preventing device mounting sleeve 23 in which a water hammer preventing device B is incorporated and a water stop mounting sleeve 24 which is disposed in parallel to the water hammer preventing device mounting sleeve 23.

Inside the water shutoff valve mounting portion 24, a communicating passage 25 is formed and the upper end of the communicating passage 25 communicates with a throttling portion formed in the upper space of sleeve 23 by way of an inlet opening 26 formed in the upper side wall of the sleeve 23.

The lower end of the communicating passage 25 communicates with a tubular connecting portion 22 by way of a water shutoff valve 29 which is provided with a strainer 28.

With such construction, an upstream (primary) passage $R_1$ is defined in the communicating passage 25 while a downstream (secondary) passage $R_2$ is defined in the opening 21.

To explain the construction of the water hammer preventing device B hereinafter in more detail, letter a indicates a plunger-like valve element which is disposed in the upper portion of the water hammer preventing device mounting sleeve 23 and the valve element a is axially reciprocably disposed in the sleeve 23.

The valve element a is substantially made of upper and lower enlarged diameter portions a-1, a-2 and an intermediate narrow diameter portion a-3. In normal water discharging operation, the upper enlarged diameter portion a-1 is disposed in the upper portion of the inlet opening 26, the intermediate narrow diameter portion a-3 is disposed at a position in the mounting sleeve 23 which communicates with the inlet opening 26 and the lower enlarged diameter portion a-2 is disposed at a position below the inlet opening 26 of the mounting sleeve 23.

In the bottom part of the water hammer preventing device mounting sleeve 23, a valve element biasing means b which holds the above-mentioned valve element in place in normal flow operation is disposed.

The valve element biasing means b comprises a water hammer preventing spring c, a pressure adjusting spring d and an intermediate spring receptacle 30.

The water hammer preventing spring c has the proximal end thereof in contact with the lower bottom wall 23a of the water hammer preventing device mounting sleeve 23 and the distal or upper end thereof in contact with the flange portion of the cup-shaped intermediate spring receptacle 30.

The pressure adjusting spring d has the proximal end thereof received in the cup portion of the intermediate spring receptcle 30 and the upper or distal end thereof received in an in contact with an upper wall 32 of an elongated cavity 31 formed in the inside of the valve element a.

In FIG. 2, numeral 33 indicates an air inlet formed in the lower portion of the water hammer preventing device mounting sleeve 23 for making the movement of the springs c, d smooth.

In FIG. 2, letter e indicates a slit formed on the outer surface of the upper enlarged-diameter portion a-1 of the valve element a and such slit forms an auxiliary passage. As described later, the auxiliary passage e can gradually decrease the amount of water which flows from the upstream passage $R_1$ to the downstream passage $R_2$ at the time the valve element a is moved in the valve closing direction to absorb the pressure change occurring with water hammer. The auxiliary passage e may be formed in a tapered shape on the surface of the upper enlarged-diameter portion a-1.

Figure 3:
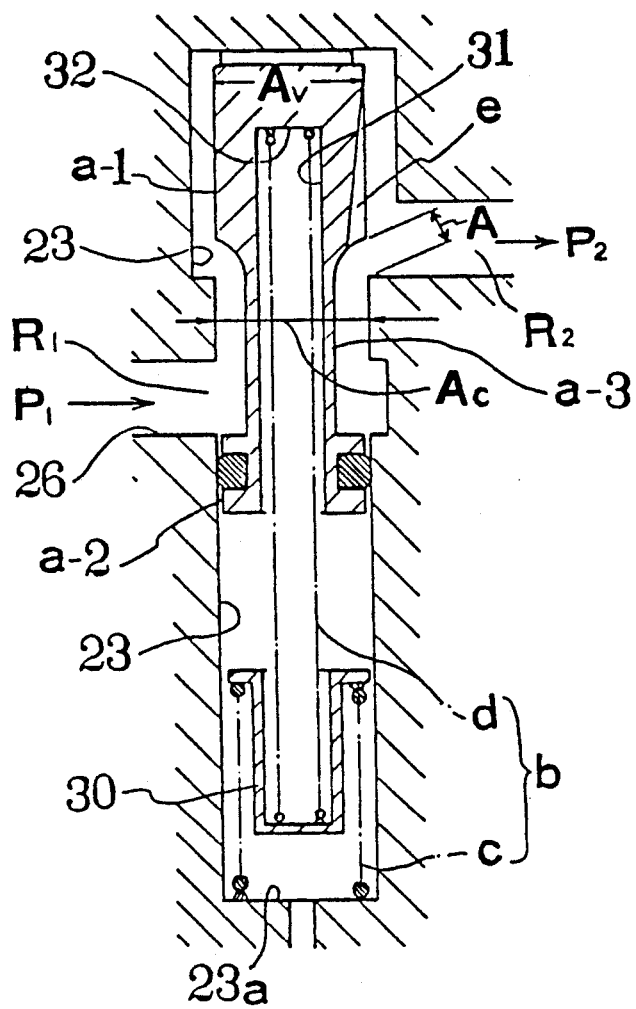
FIG. 3 is a schematic view of the water hammer preventing device.
Figure 3A:
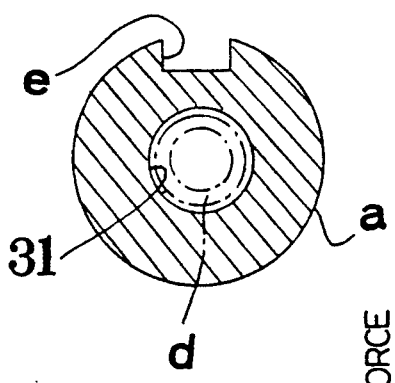
FIG. 3A is a cross sectional view of the valve element provided with an auxiliary passage.

As shown in FIG. 3A, the auxiliary passage e has a rectangular or triangular or semi-circular cross section.

In the above water hammer preventing device B having above-mentioned construction, among various valve element biasing forces applied to the valve element a, an initial valve element biasing force $F_1$ is set to be equal to a downstream valve element pressing force $F_2$ which occurs in the downstream passage $R_2$, namely, $F_1 = F_2$.

The downstream valve element pressing force is expressed by the following formula: $F_2 = P_2 \cdot Av + P_1 \cdot (Ac - Av)$.

In the formula, $P_1$ is upstream pressure of the upstream passage $R_1$, $P_2$ is downstream pressure of the downstream passage $R_2$, Av is the area of the rear-pressure receiving surface of the valve element a and Ac is the cross sectional area of the mounting sleeve 23 at the throttling portion 27.

Due to such setting of parameters, in the normal flowing operation, when the upstream pressure $P_1$ in the upstream passage $R_1$ and/or the downstream pressure $P_2$ in the downstream passage $R_2$ are changed, the valve element a is moved in proportion to the amount of the pressure change and adjusts the opening area A of the throttling portion 27 so as to regulate the amount of water flowing into the downstream passage $R_2$ from the upstream passage $R_1$.

Furthermore, in this embodiment, as shown in FIG. 2 and FIG. 3, the value of (Ac−Av) is set as small as possible. Namely, since the projected area which is the difference between the cross sectional area of the mounting sleeve 23 at the throttling portion 27 and the pressure-receiving surface Av of the valve element a is set as small as possible, the above-expressed formulae can be expressed as follows: $F_1 = P_2 \cdot Av$.

Accordingly, in this embodiment, the valve element a is always biased in a valve opening direction by means of a valve element biasing means b and the valve element biasing means b cooperates together substantially with the downstream pressure $P_2$ which is produced in the downstream passage $R_2$ to reciprocate or move the valve element a and effect the regulation of pressure by the adjustment of the opening area A of the throttling portion 27. Thereby, the adverse influence of the change of the upstream pressure $P_1$ can be prevented. The valve movement volume (the opening area A of the throttling portion × stroke of the valve element a) can be minimized, thus making the water hammer preventing device B as compact as possible.

Furthermore, in this embodiment, the valve element biasing means b is made of the water hammer preventing spring c and the pressure adjusting spring d which are connected in series, wherein the former spring c has a large spring constant $k_1$ while the latter spring d has a small spring constant $K_2$.

Accordingly, assuming that the combined spring constant of both springs c, d is denoted by $k_0$, the combined force of both springs c, d, namely, the valve element biasing force, is denoted by F and the stroke of the valve element a is denoted by S, the combined spring coefficient $k_0$ and the valve element biasing force F are expressed by the following formula respectively.

$$k_0 = k_1 \cdot k_2 / (k_1 + k_2) \quad (1)$$

$$F = k_0 \cdot s = [k_1 \cdot k_2 / (k_1 + k_2)] S \quad (2)$$

Namely, the valve element biasing force F is gradually increased until the stroke S reaches a preset value and after reaching the value, is sharply increased.

Accordingly, within the range of the normal pressure change, since the combined spring constant $k_0$ is small, even when the downstream presure $P_2$ in the downstream passage $R_2$ is increased slightly, the valve element a is moved proportionally to throttle the opening area A of the throttling portion 27 thus providing the water hammer preventing device B with a pressure regulating function so as to always hold the downstream pessure at constant value.

Meanwhile, when the water hammer is produced by suddenly effecting the water stopping operation, the upstream pressure $P_1$, and the downsteam pressure $P_2$ are both elevated. As a result of such pressure elevation, $F_1 < F_2$.

Accordingly, in this embodiment, the valve element a is moved in a valve closing direction to compress the valve element biasing means b so that the instantaneous pressure energy that water hammer holds is transformed into the compressive elastic energy and absorbed.

Figure 4:
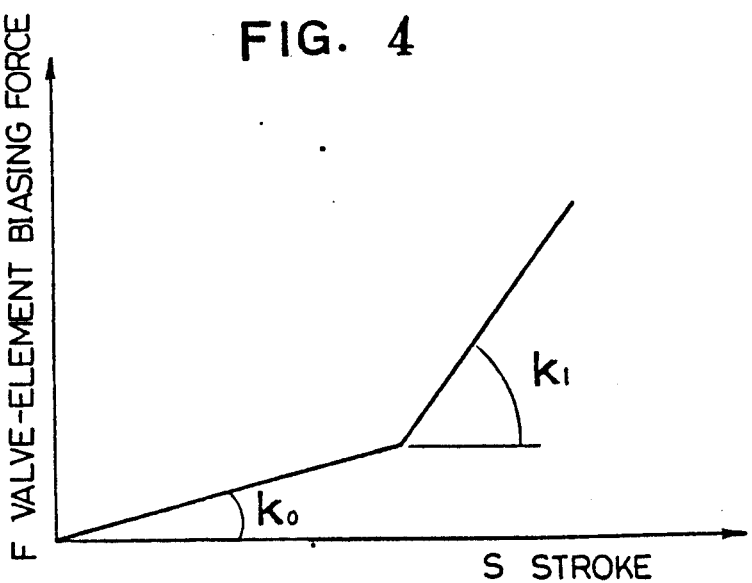
FIG. 4 is a graph showing the relationship between the valve element biasing force and the stroke of the valve element.

As shown in FIG. 4, the spring constant of the combined spring force is the spring constant $k_1$ of the water hammer preventing spring c so that when the downstream pressure $P_2$ in the downstream passage $R_2$ is sharply increased, the valve element a is moved to throttle the opening area of the throttle portion thereby effectively absorbing the sharp pressure change caused by the water hammer.

Furthermore, in this embodiment, since the auxiliary slit e is formed on the outer surface of the valve element a, a suitable amount of water which corresponds to the valve moved volume (the opening area A of the throttle portion 27 × stroke of the valve element a) of the valve element a is readily conducted from the water shutoff valve side to the mixing valve side passage. Accordingly, the valve element a is readily moved in a valve closing direction and the sharp pressure change caused by water hammer is effectively absorbed.

To explain other constructional elements or members in FIG. 2, numeral 35 indicates a cover lid, numerals 36,37 indicate O-rings and numeral 38 indicates a cap nut for connecting purpose.

Figure 5:
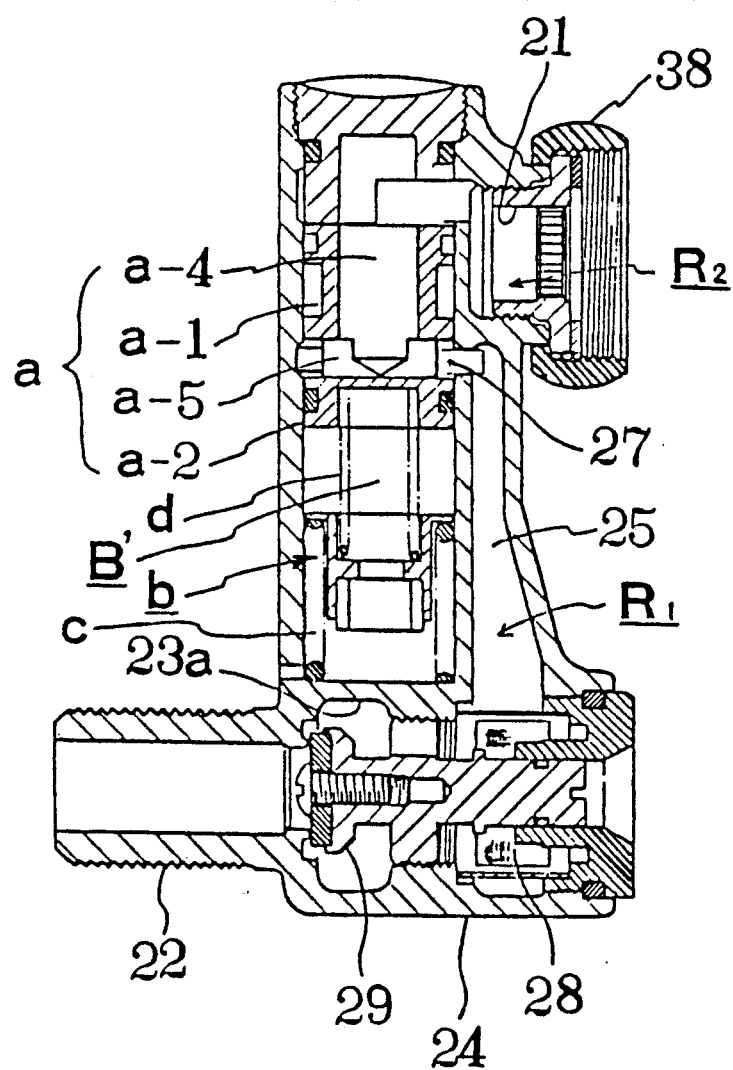
FIG. 5 is a cross sectional view showing the inner structure of the water hammer preventing device of a modification of the first embodiment.

FIG. 5 shows a modification of this embodiment, wherein the modification has a water hammer preventing device B' which is similar in construction to the water hammer preventing device B of the above-mentioned embodiment except for following construction.

In lieu of the intermediate narrow diameter portion a-3, a T-shaped flow passage which is made of an axial flow passage a-4 and a redial flow passage a-5 is formed in a valve element a, wherein the radial flow passage a-5 communicates with the upstream passage $R_1$ and the upper end of the axial flow passage a-4 communicates with the downstream passage $R_2$.

With such construction, when the downward pressure $F_2$ is changed during the water discharging operation, the valve element a is always biased in a valve closing direction and the valve biasing means b is constructed such that it substantially cooperates only with the downward valve element pressing force $F_2$ to move and reciprocate the value element a and regulate the pressure by adjusting the opening area A of the throttle portion. Accordingly, the movement volume of the valve element a can be minimized so that the water hammer preventing device B can be made as compact as possible.

Figure 7:
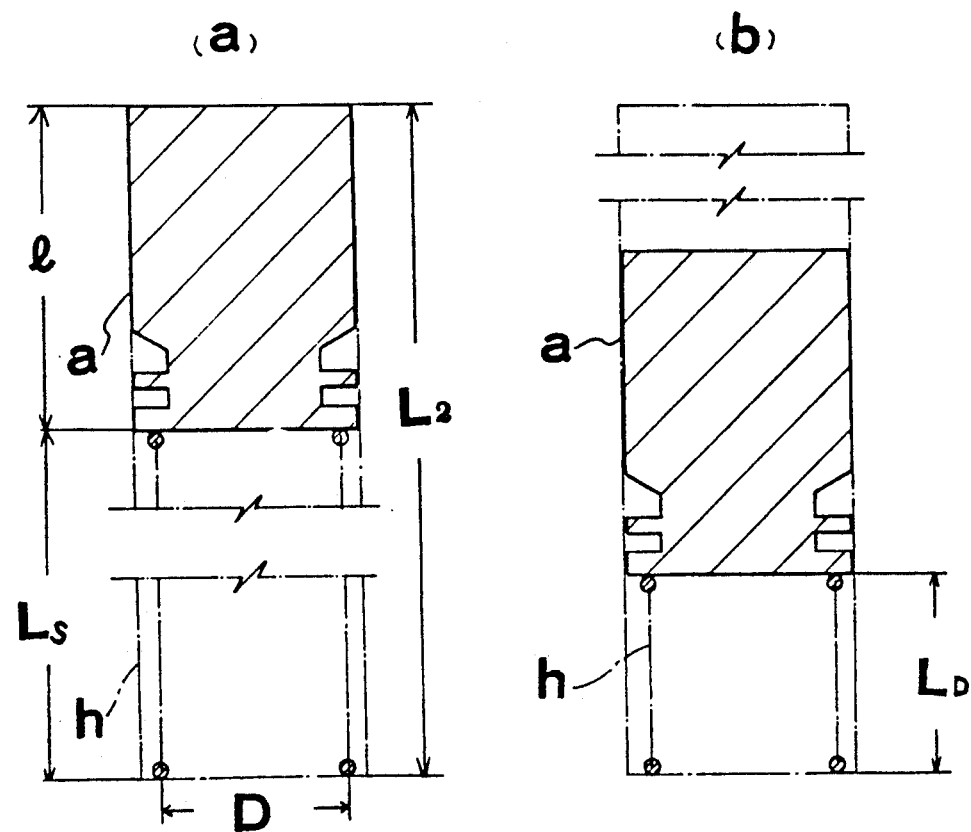
FIGS. 7(a), (b) are schematic cross sectional views of the water hammer preventing device C which is provided with the a valve element biasing spring h.

A water hammer preventing device C which has a single kind of valve element biasing spring h is devised as shown in FIG. 7 and such valve element biasing spring h is designed such that it provides the same water hammer preventing function and pressure regulating function as the above-mentioned water hammer preventing device B which comprises the water hammer preventing spring c and the pressure regulating spring d.

Space necessary for accommodating the spring c and d is compared hereinafter with the space necesssary for accommodating the spring h by giving physical data in conjuction with attached drawings FIG. 6 and FIG. 7.

Figure 6:
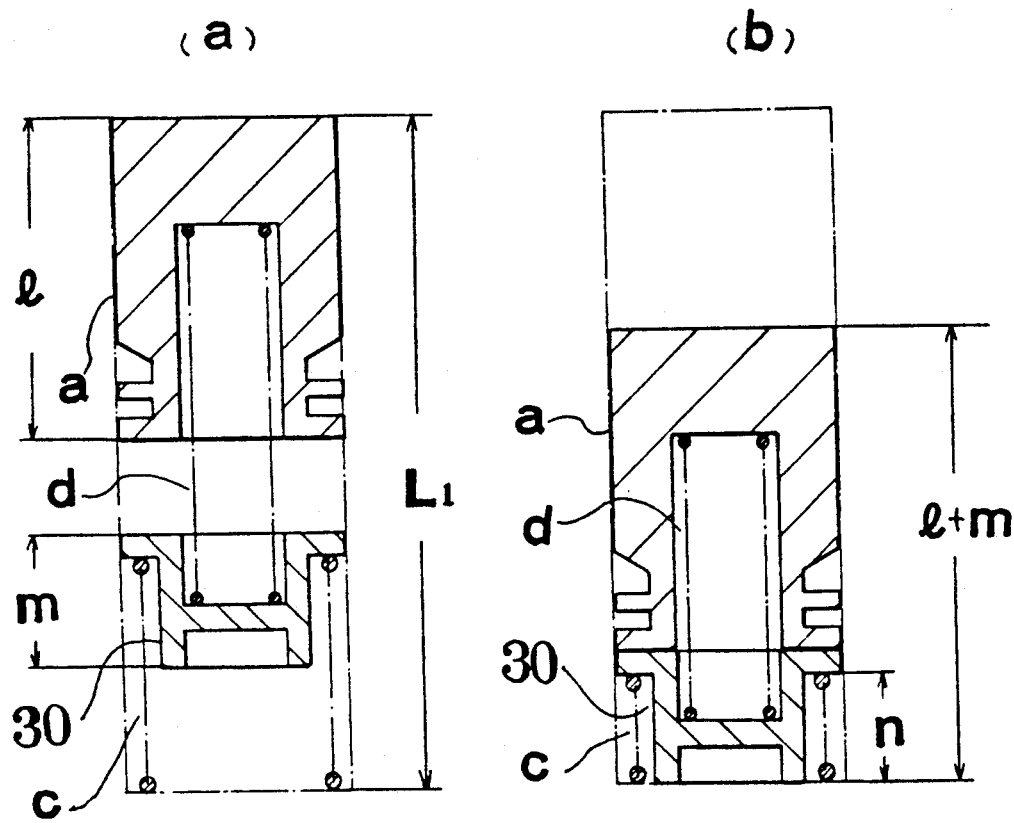
FIGS. 6(a), (b) are schematic cross sectional views of the water hammer preventing device B.

FIGS. 6 (a) and (b), the water hammer preventing device B of the present invention is schematically shown while the water hammer preventing device C having the valve element biasing spring h is schematically shown in FIG. 7 (a) and (b).

To explain the water hammer preventing device B of this invention first, the water hammer preventing spring c and the pressure regulating spring d take the positions as shown in FIG. 6 (a) at the time of mounting thereof, wherein the valve element a has the length l of 33 mm, the intermediate spring receptacle has the length m of 13.5 mm and the entire length $L_1$ is set at 68.5 mm. When the maximum load is applied, the springs c,d take the contracted position as shown in FIG. 6 (b).

FIG. 6 (b), the length n of the water hammer preventing spring c becomes 12.5 mm.

Assuming that the spring constant $k_1$ of the water hammer preventing spring c is 3.044 kgf/mm2 and the spring constant $k_2$ of the pressure regulating spring d is 0.1177 kgf/mm, the maximum load $F_{max} = 3.044 \times (20.5 - 12.5)32\ 24.352$ kgf. In the formula, 20.5 mm is the length of the water hammer preventing spring under no load.

To obtain the above-mentioned maximum load $F_{max}$ with the water hammer preventing device C shown in FIG. 7 (a) (b), the entire length $L_2$ becomes as follows.

Since the wire diameter of the pressure regulating spring d is small, the maximum load $F_{max}$ exceeds the allowable load for the spring d, so that, in calculation of the maximum load $F_{max}$, although the spring constant K of the valve element biasing spring h is set to be the spring constant $k_1$ of the pressure regulating spring $d_1$ the wire diameter and coil diameter of the valve element biasing spring h are set to be those of the water hammer preventing spring c.

Assuming that $L_D$ = length at completely compressed position (FIG. 7 (b)), $L_S$ = length at the time of mounting (FIG. 7 (a), wire diameter d of the valve-element biasing spring d = 2.6 mm, coil diameter D of the valve-element biasing spring D = 17 mm, effective coil winding number
$N = Gd^4/8KD^3 = 7000 \times 2.6^4/8 \times 0.1177 \times 17^3 = 69.15$,
where G is the modulus of transverse elasticity Accordingly, $L_D = (69.15 + 2) \times 2.6 = 184.99$ mm Assuming $L_F$ as the spring length under no load and that the pressure is regulated under 1 kgf/cm², the following calculation can be made.

$(L_F - L_S) \times 0.1177 = \pi$ $(L_F - L_D) \times 0.1177 = 24.352$ $L_S = L_D - (\pi - 24.352)/0.1177 = 362.5$ mm Namely, $L_2 = 35 + L_S = 400.2$ mm $= 5.84 L_1$ Namely, to carry out the water hammer preventing function and the pressure regulating function with a single valve element biasing spring h, such spring h must be approximately 6 times as long as the springs c,d of the present invention.

As apparent from the above comparsion and review, the water hammer preventing device B, B' can be made as compact as possible while possessing sufficient water hammer preventing function and pressure regulating function.

Although the water hammer preventing device B, B'are herein illustrated as being accommodated in the cold water supply pipe 11 and the hot water supply pipe 12, the devices B may be mounted in the valve body of the mixing valve 10.

Second Embodiment

The second embodiment is explained hereinafter in view of FIG. 8 to FIG. 16.

Figure 8:
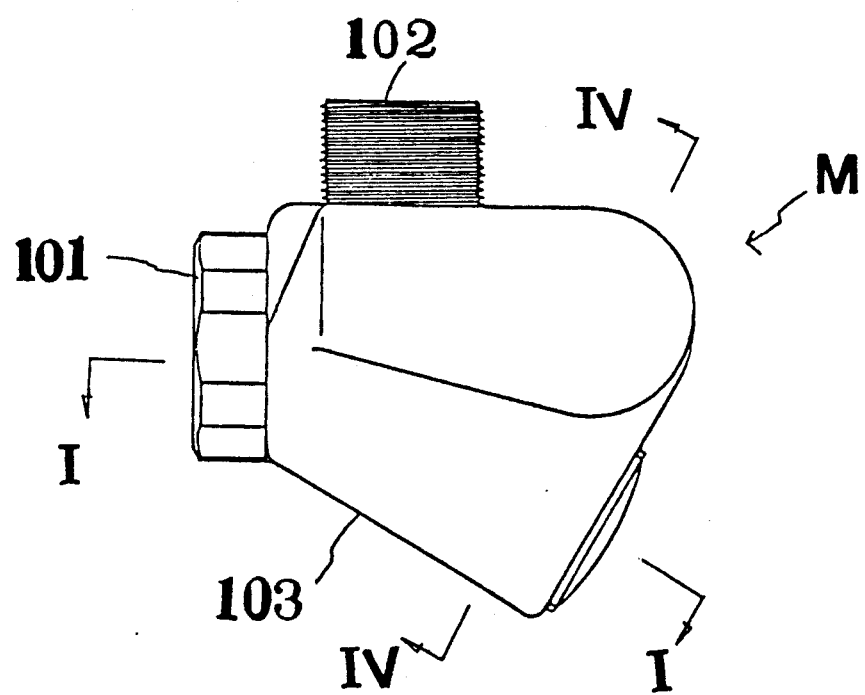
FIG. 8 is a side view of a water shutoff valve of a second embodiment of this invention.

In FIG. 8, the entire structure of a water shutoff valve M which can be mounted on a pipe located upstream of a faucet as described later is shown.

The water shutoff valve M comprises, as shown in FIG. 8 to FIG. 13, a valve casing 103 which is provided with a water inlet port 101 and water outlet port 102 on the upper and side surfaces thereof respectively in a perpendicular relationship and within the valve casing 103, a water shutoff section C, a strainer section N and a water hammer preventing section B″ are provided.

Figure 9:
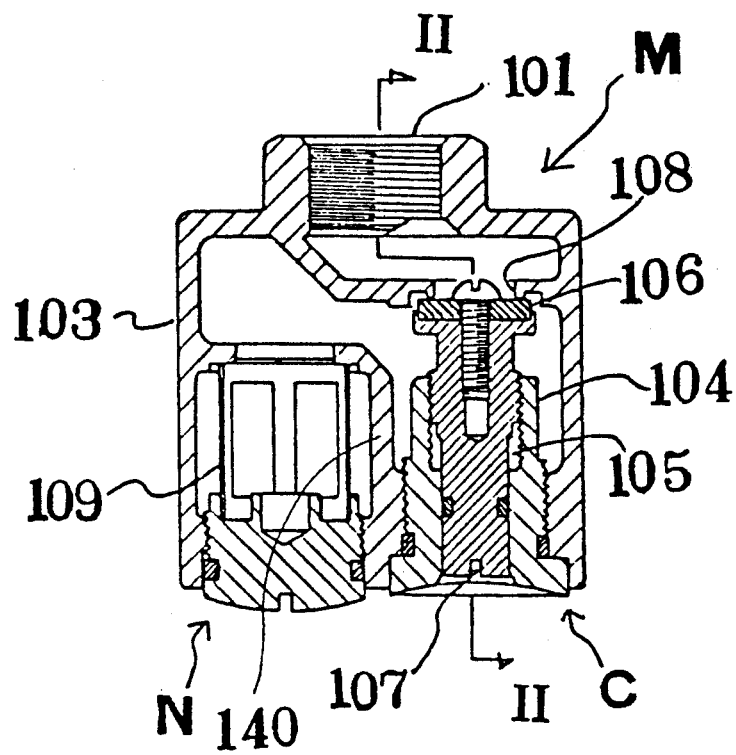
FIG. 9 is a cross sectional view of the above valve taken along the line I—I of FIG. 8.
Figure 10:
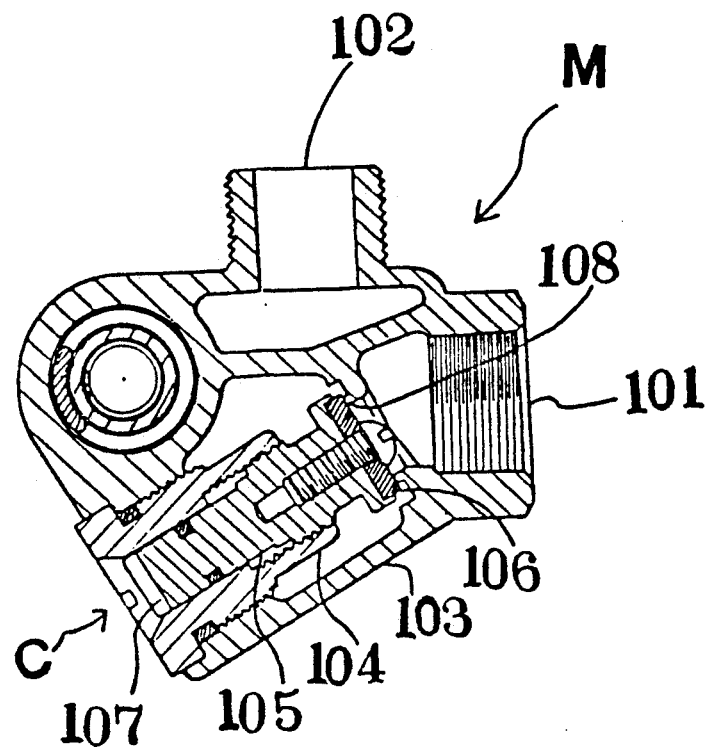
FIG. 10 is a cross sectional view of the above valve taken along the line II—II of FIG. 9.

The water shutoff section C has the construction shown in FIG. 9 and FIG. 10.

A valve element guide 104 is threadedly mounted on the side wall of the valve casing 103 in such a manner that the axis thereof is inclined relative to the horizontal. A water shutoff valve element 105 is threadedly engaged into the valve element guide 104 and is provided wiht a packing 106 at the distal end thereof.

By engaging an end of a driver into a slit on the proximal end 107 of the water shutoff valve element 105 and turning the element 105, the element moves axially to make the packing 106 come into contact with a water shutoff valve seat 108 formed in the valve casing 103 or retract from the valve seat 108 thereby allowing or terminating the communication between the water inlet port 101 and the water outlet port 102.

Figure 11:
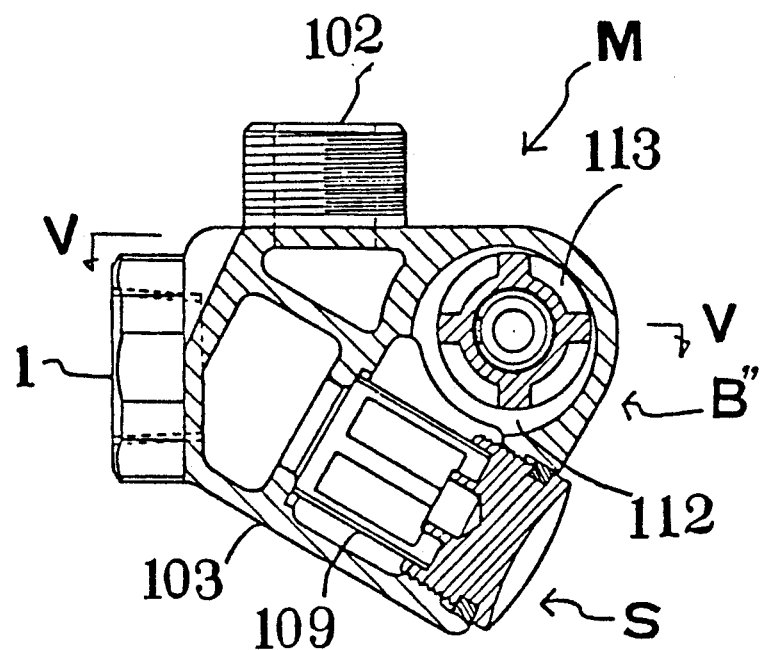
FIG. 11 is a cross sectional view of the above valve taken along the line III—III of FIG. 12.
Figure 12:
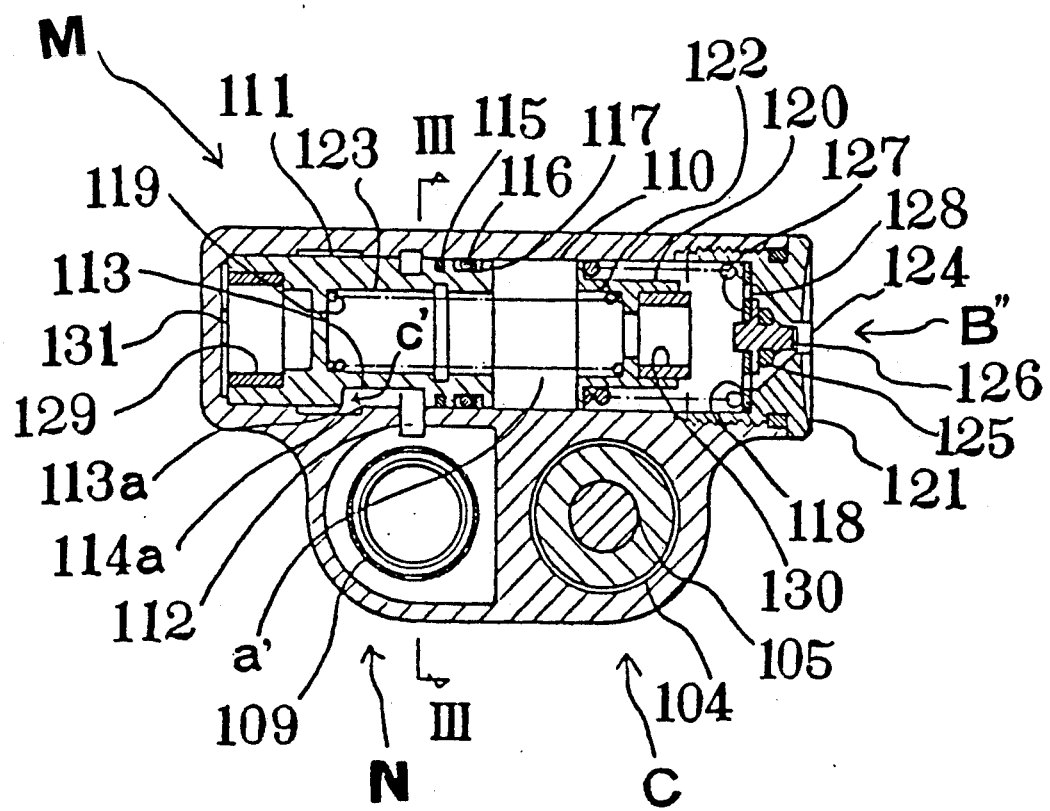
FIG. 12 is a cross sectional view of the above valve taken along the line IV—IV of FIG. 8.

The construction of the strainer section N is shown in FIG. 9, FIG. 11 and FIG. 12.

As shown in FIG. 9, the strainer section N is disposed in the valve casing 103 parallel to the water shutoff section C while being separated by a partition wall 140 from the water shutoff section C. The strainer section N substantially comprises a filter 109 which is made of an approximately cylindrical metal mesh screen and the axis of the strainer is also inclined relative to the horizontal in the same manner as the valve element guide 104.

Since the water shutoff section C is opened in the normal operating condition, water which enters the valve casing 103 flows as shown in the following path: the water inlet port 101→ the water shutoff valve seat 108→ the filter 109 (from the outside to the inside) and the water is strained.

Figure 13:
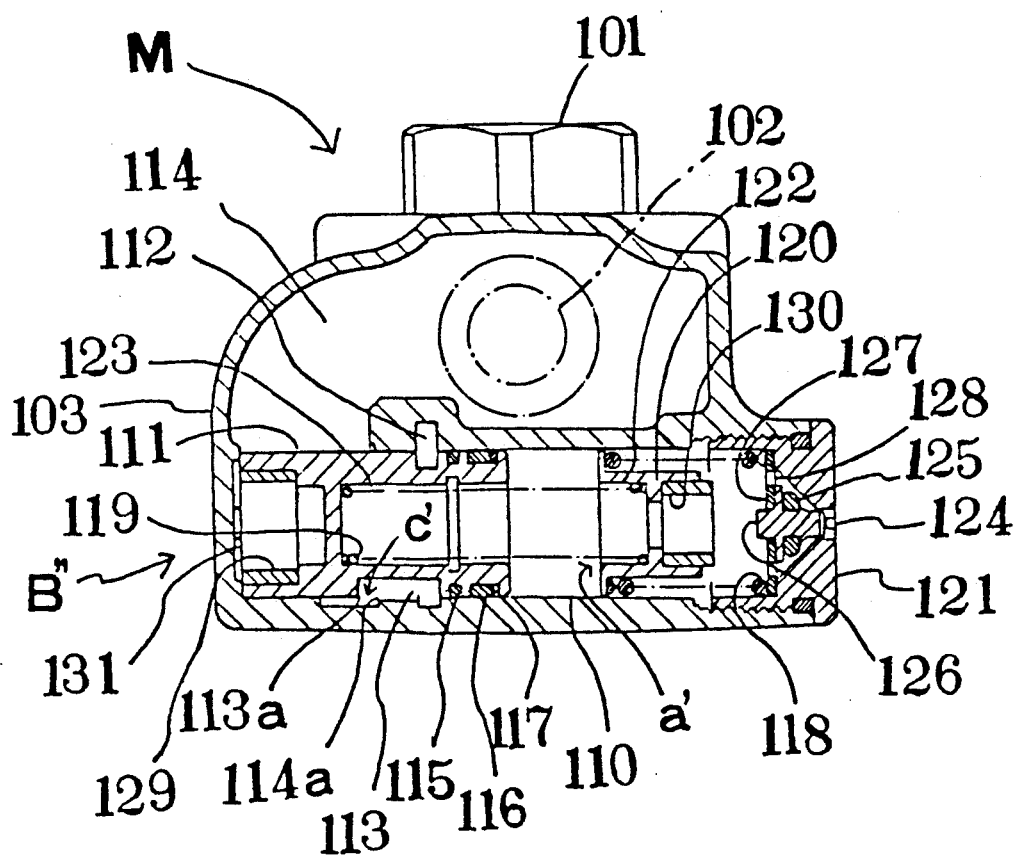
FIG. 13 is a cross sectional view of the above valve taken along the line V—V of FIG. 11.

The construction of the water hammer preventing section B″ is shown in FIG. 11 to FIG. 13.

The section B″ is disposed at the upper part of the valve casing 103 and has an axis thereof directed perpendicular to the axis of the water shutoff valve section C and the axis of the strainer section N.

The water hammer preventing section B″ substantially comprises a water hammer preventing means mounting sleeve 110, a plunger-like valve element 111 axially reciprocably disposed in the sleeve 110 and a valve element biasing means a′ applying a biasing force on the valve element 111 in a direction to open the valve element 111.

The insides space defined in the water hammer preventing means mounting sleeve 110 communicates with the inside of the strainer N by way of an upstream passage 112.

As shown in FIG. 11, the valve element 111 is provided with four communicating passages 113 on the outer surface thereof circumferentially equidistantly (the number of the passages 113 may be increased to for example, six) and the above-mentioned upstream passage 112 communicates with the right-side end of the communicating passages 113 and the left-side end of the communicating passages 113 communicates with the water outlet port 102 by way of a downstream passage 114 and a throttling portion c′ is formed between the left-side end 113a of the communicating passage 113 and the right-side end 114a the downstream passage 114.

Due to such construction, the water which enters into the strainer section N by way of the water inlet port 101 and the water shutoff valve seat 108 subsequently flows in the following path: the strainer section N to the upsteam passage 112 to the communicating passage 113 to the downstream passage 114 and flows out from the valve casing 103 into an outside pipe not shown through the water outlet port 102.

On the outer peripheral surface of the right-side portion of the valve element 111, a plurality of annular recesses are formed in a parallely spaced-apart manner in an axial direction and a wear-resistant ring 115, an O-ring 116 and a back-up ring 117 are mounted in the recesses whereby deterioration by wear between the water hammer preventing device mounting sleeve 110 and the valve element 111 can be reduced and the water leakage can effectively be prevented.

The valve element biasing means a′ comprises a first spring 118, a second spring 119 which has a spring coefficient which is smaller than that of the first spring 118 and an intermediate spring receptacle 120 interposed between the two springs 118, 119.

The first spring 118 has one end thereof in contact with the end surface of a plug 121 which is threadedly mounted on the right-end of the water hammer preventing means mounting sleeve 110 and the other end received in the intermediate spring receptacle 120 to bias the receptacle 120 in a leftward direction.

The second spring 119 has one end thereof received in and supported by the intermediate spring receptacle 120 and the other end in contact with the valve element 111 to bias the valve element 111 in a leftward direction.

Namely, the valve element 111 is biased in a leftward direction or in a direction to open the throttling portion c′ by means of a pair of first and second springs 118, 119 which are arranged in series.

To be more specific, the respective ends of the second spring 119 are received in the recesses 122, 123 which are formed in the intermediate spring receptacle 120 and the valve element 111, respectively.

The plug 121 is provided with an air bleed port 124 which makes the movement of the valve element 111 smooth. The air bleed port 124 has the inside surface thereof formed into a conical-shaped recess and an air valve element 126 provided with an O-ring 125 on the outer surface thereof is accommodated into the recess. By the rightward movement of the air valve element 126, the air bleed port 124 is closed and water leakage therefrom can be prevented.

Numeral 127 indicates a washer which guides the movement of the air valve element 126 and is provided with an air bleed aperture 128.

Numerals 129, 130 indicate dampening members which are accommodated in the left end of the valve element 111 and the right end of the intermediate spring receptacle 120, respectively.

In the water hammer preventing section B, the valve element biasing force $F_1$ of the valve element biasing means a′ has a following characteristics.

Figure 14:
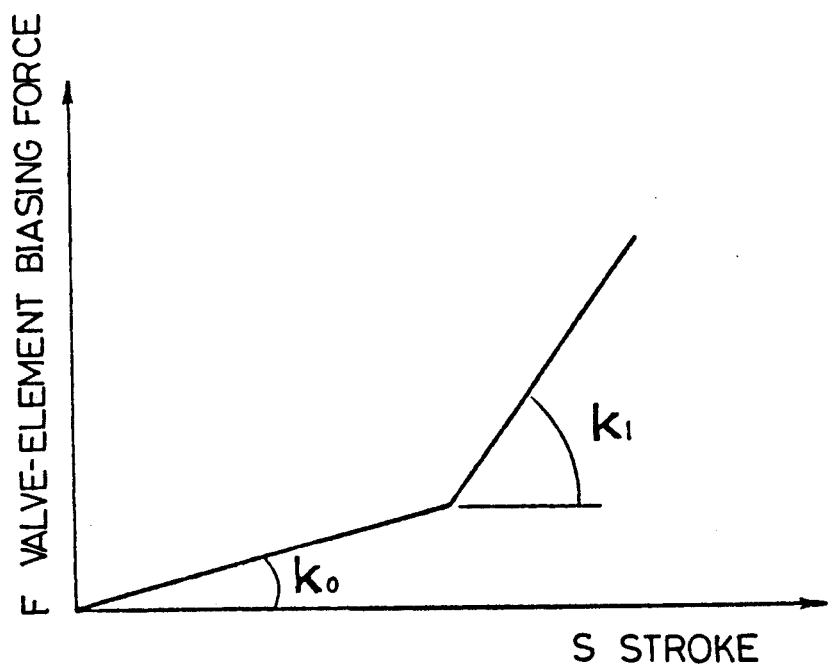
FIG. 14 is a graph showing the characteristic of valve element biasing force.

Namely, as shown in FIG. 14, the spring coefficient K of the valve element biasing means a is set in two stages, namely, $K = k_1 \cdot k_2 / (k_1 + k_2)$ until one end of the valve element 111 comes into contact with the corresponding end of the intermediate spring receptacle 120 while $K = k_2$ after one end of the valve element 111 has come into contact with the corresponding end of the intermediate spring receptacle 120.

In the above formula, $k_1$ is the spring constant of the first spring 118 and $k_2$ is the spring constant of the second spring 119.

The valve element biasing force is expressed by the following formula; $F_2 = P_2 \cdot Av + P_1 \cdot (Ac - Av)$.

In the formula, $P_1$ is upstream pressure of upstream passage 112, $P_2$ is downstream pressure of downstream passage 114, Av is area of the left end surface 131 of the valve element 111 and Ac is cross-sectional area of the mounting sleeve 110.

Figure 15:
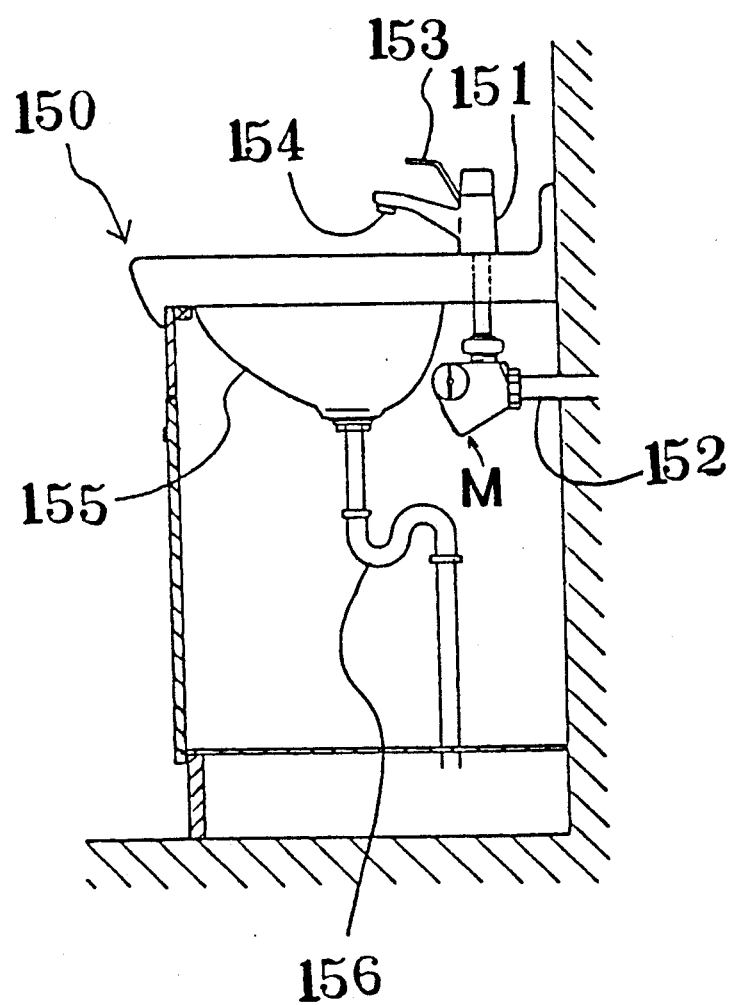
FIG. 15 is an explanatory view showing the manner of using the water shutoff valve of this embodiment.

In FIG. 15, a water shutoff valve M having the above-mentioned construction is interposed between a fixture 151 on a washing basin 150 and a water supply pipe 152. Numeral 153 indicates a faucet handle for regulating the flow of water through the spout 154, numeral 155 indicates a bowl and numeral 156 indicates a water drainage pipe.

Figure 16:
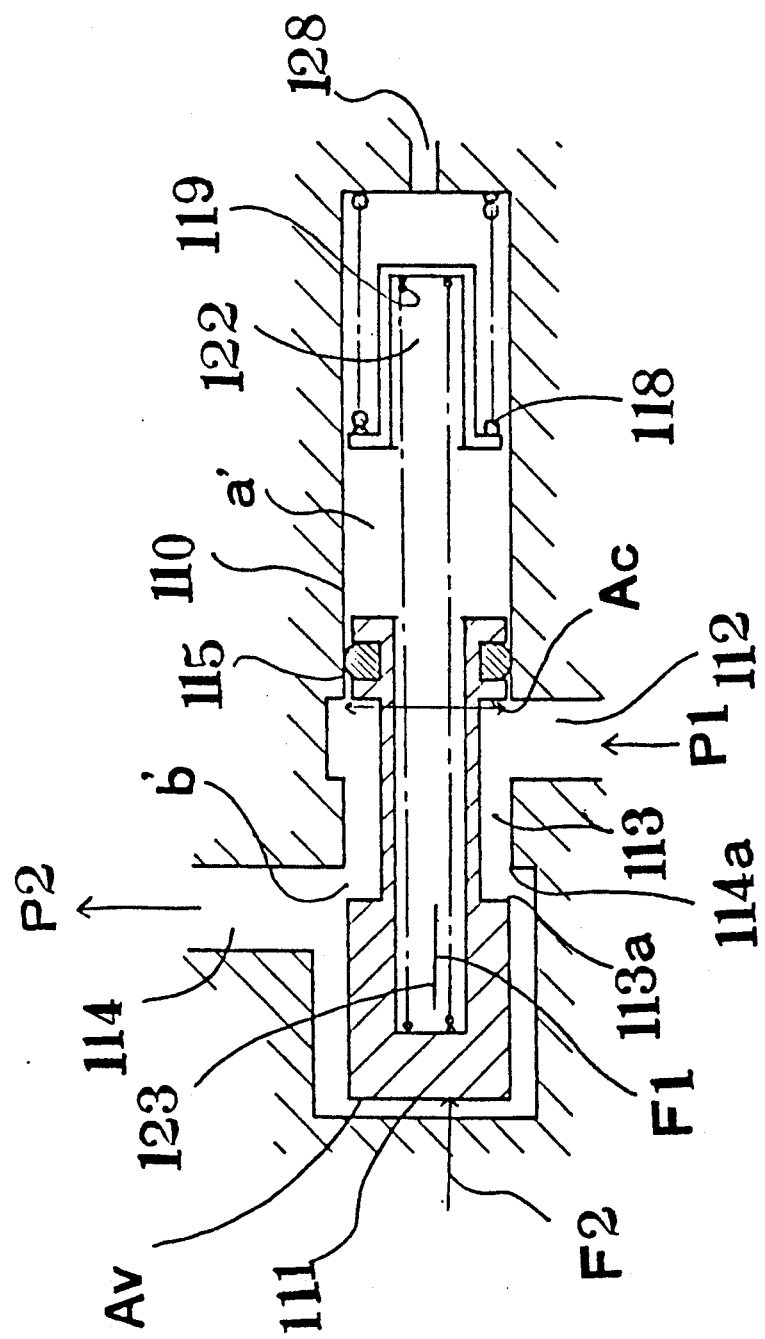
FIG. 16 is a cross sectional view showing the operation of the waterhammer preventing means.
Figure 17:
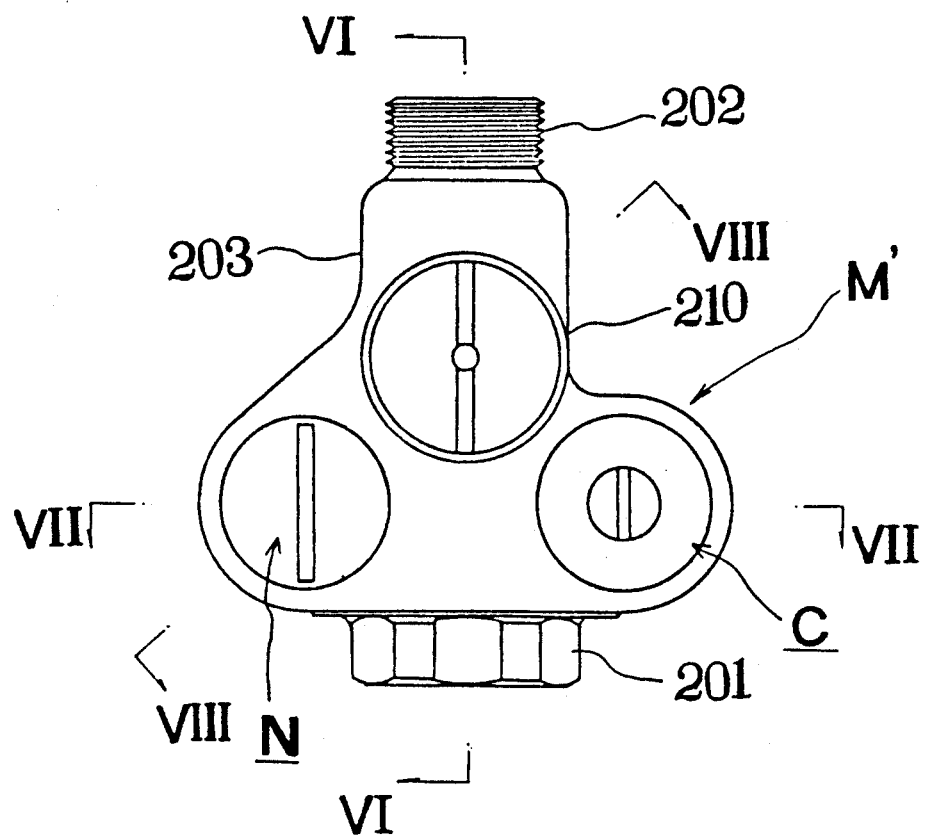
FIG. 17 is a front view of a water shutoff valve of a third embodiment of this invention.
Figure 18:
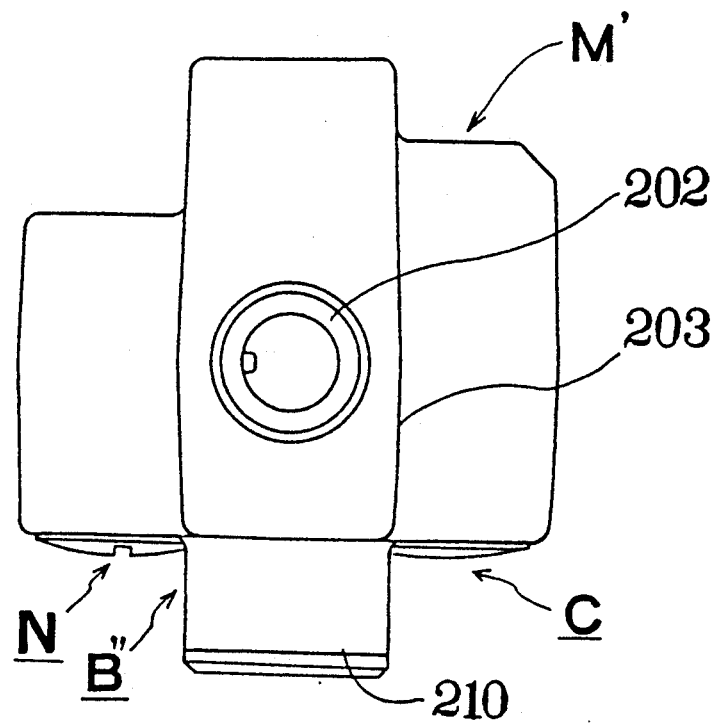
FIG. 18 is a plan view of the water shutoff valve of the third embodiment of this invention.
Figure 19:
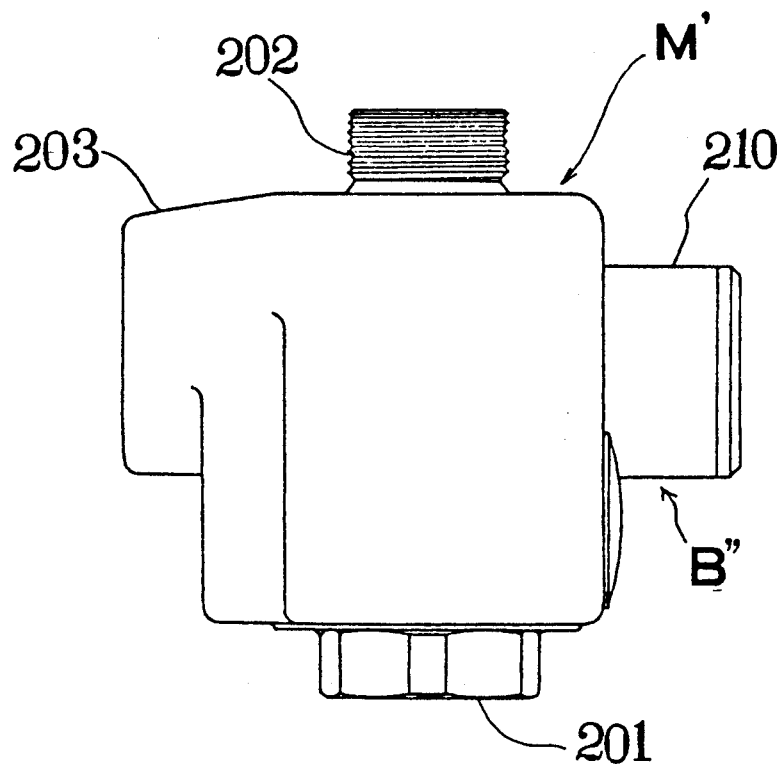
FIG. 19 is a right side view of the water shutoff valve of the third embodiment of this invention.
Figure 20:
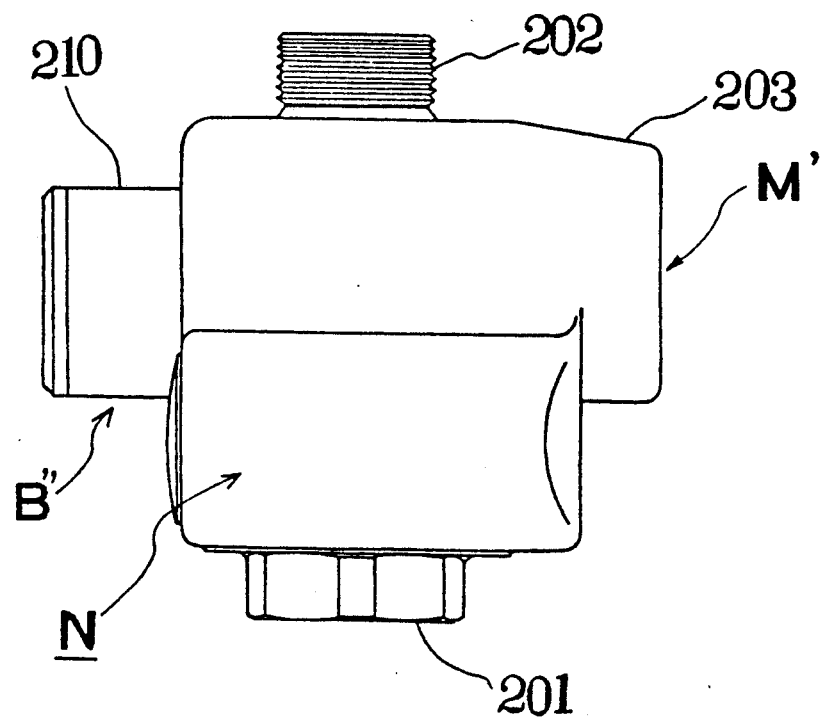
FIG. 20 is a left side view of the water shutoff valve of the third embodiment of this invention.
Figure 21:
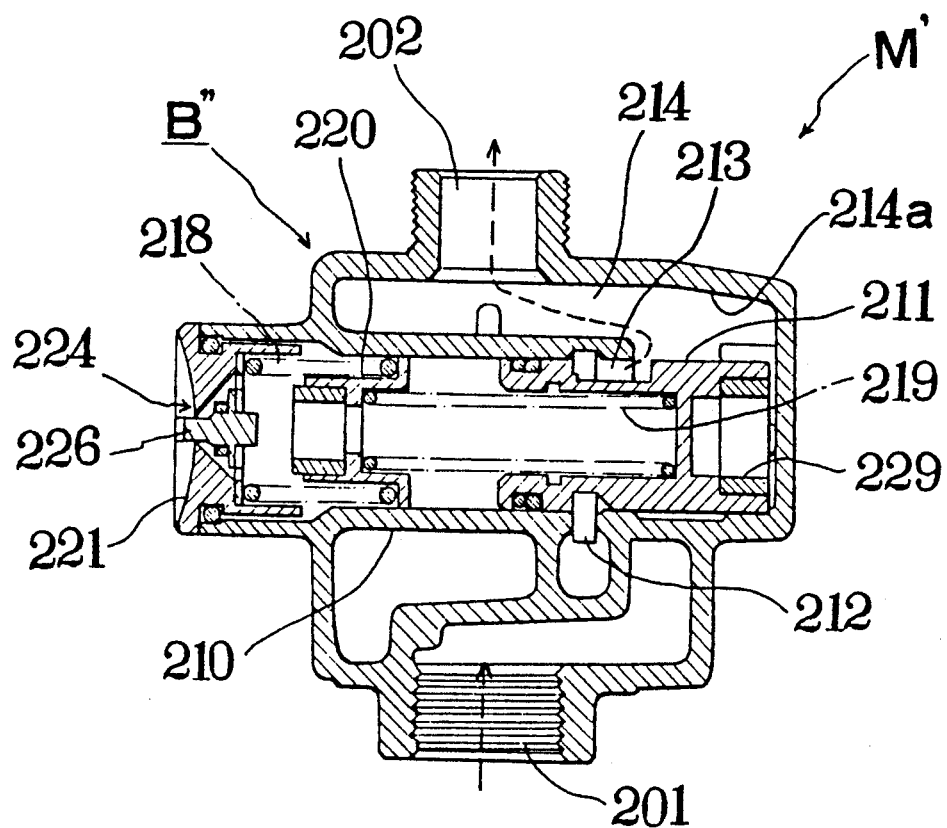
FIG. 21 is a cross sectional view of the above valve taken along the line VI—VI of FIG. 17.
Figure 22:
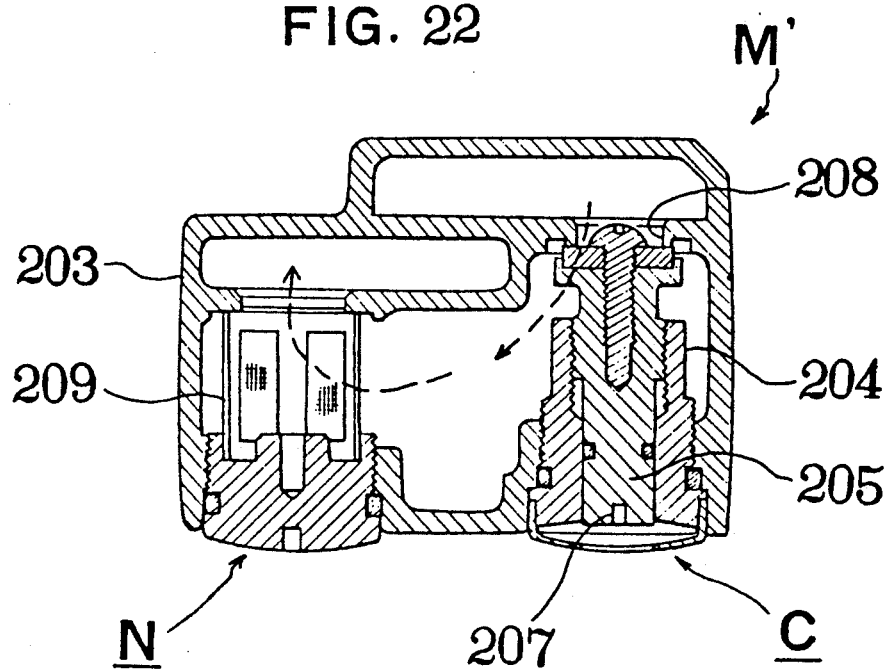
FIG. 22 is a cross sectional view of the above valve taken along the line VII—VII of FIG. 17.
Figure 23:
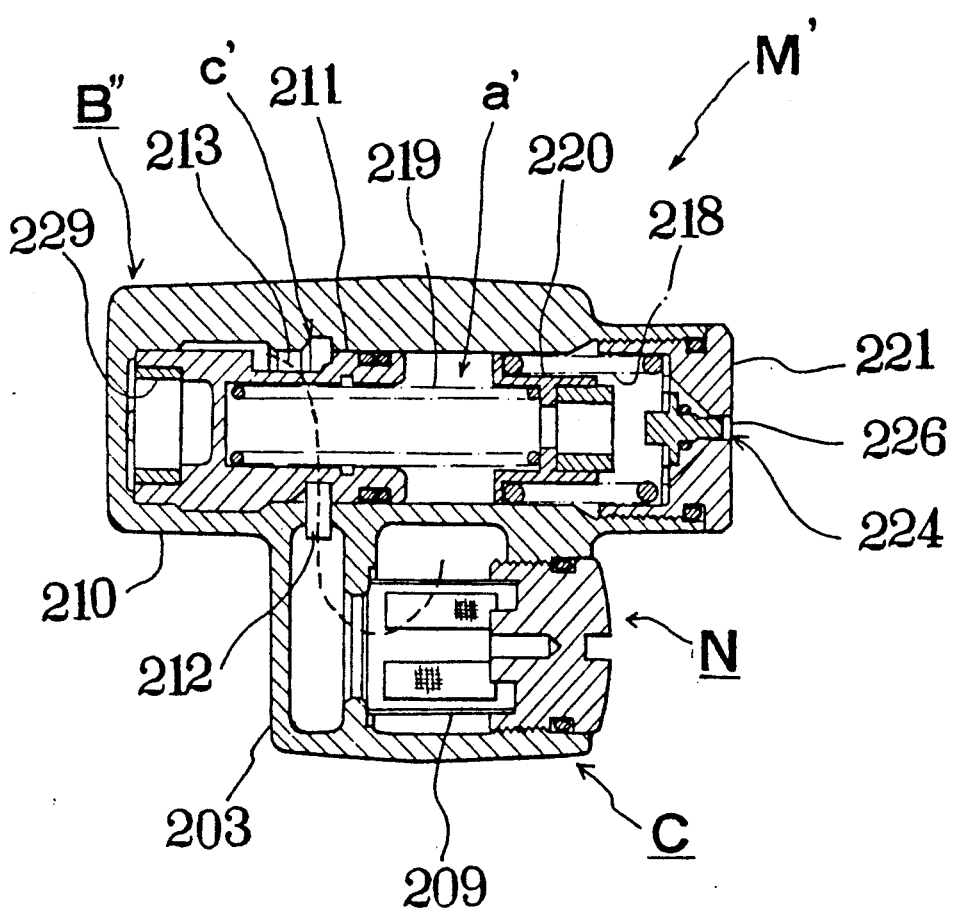
FIG. 23 is a cross sectional view of the above valve taken along the line VIII—VIII of FIG. 17.
Figure 24:
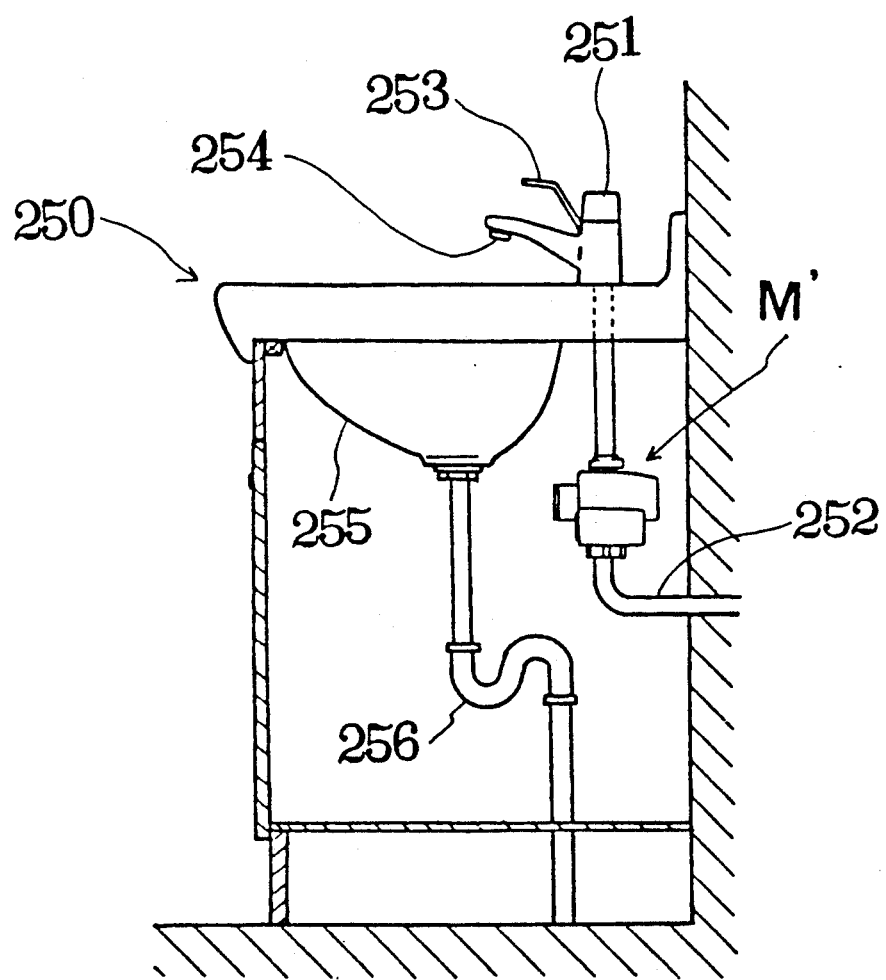
FIG. 24 is an explanatory view showing the manner of using the water stop valve of the third embodiment.

The flow regulating function and the water hammer preventing function during water flowing operation by the above-mentioned water hammer preventing section B″ will be explained hereinafter in view of FIG. 16.

Assuming that the upstream pressure $P_1$ or the downstream pressure $P_2$ is elevated (or lowered) during the water flowing operation, the flow amount through the water shutoff valve M increases (or decreases) and corresponding to such change of flow amount, the valve element 111 moves right (or left) and narrows widens the opening area b′ of the throttling portion C′ and automatically regulates the flow amount of water from the water shutoff valve M.

Since the wear ring 115 is interposed between the water hammer preventing means mounting sleeve 110 and the valve element 111, surging which may tend to occur during water flowing operation is restricted for a long time.

Furthermore, assuming that the water hammer is about to occur in the downstream passage 114 due to the sudden water shutoff operation of the spout 151 by a user, the sharp pressure rise, namely, water hammer, is effectively absorbed by the displacement of the valve element biasing means which corresponds the movement of the valve element 111 and the increase of the space or volume of the downstream passage 114.

Namely, when the water hammer is about to occur, the pressure in the upstream passage 112 and the downstream passage 114 sharply increases. In this phenomenon, since the water hammer occurs in the downsteam passage 114, the pressure $P_2$ is larger than the pressure $P_1$ and the area Av is larger than the area Ac. As apparent from the above-mentioned formula $F_2 = P_2 \cdot Av + P_1 \cdot (Ac - Av)$, the valve element biasing force $F_2$ is sharply increased and the valve element 111 is moved right. Accordingly, the opening area b' of the throttling portion c' is narrowed while the flow amount space or volume in the downstream passage 114 is increased corresponding to the valve movement volume of the valve element 111 thus absorbing the pressure of the water hammer and the energy of the flow to restrict the adverse effect of the water hammer to the upstream passage 112 and the water supply pipe 152.

Furthermore, as described previously, in this embodiment, the spring constant K is set to vary in two stages corresponding to the stroke of the valve element 111.

Accordingly, during the usual water flowing operation, the valve element 111 is biased with the small spring constant to smoothly regulate the flow amount of the spouting water and when a pressure of large magnitude such as water hammer is applied the valve element 111, approximately at the stroke end of the valve element 111, the valve element biasing force $F_1$ generated by the large spring constant $k_1$ counters the valve element pressing force $F_2$ so that the full closing of the throttling portion c' is prevented while preventing the intermediate spring receptacle 120 from bumping into the plug 121.

In this manner, the flow regulating function and the water hammer preventing function are both achieved by the water shutoff valve of this embodiment.

As has been described heretofore, the water shutoff valve can absorb the sharp pressure rise of water hammer and prevent the occurrence of unusual or annoying sound and water leakage from the piping such as the water supply pipe 152. Namely, the water shutoff valve is provided with a flow amount regulating function and a water hammer preventing function and the water shutoff valve can be considerably compact and the construction thereof is also considerably simplified.

Third Embodiment

The third embodiment is described in view of FIG. 17 to FIG. 24.

Differing from the water shutoff valve of the second embodiment which is provided with the water inlet port 101 and the water outlet port 102 on the upper and side surfaces of the valve casing 103, the water shutoff valve M' of this embodiment is characterized in that a water inlet port 201 and water outlet port 202 are provided on the upper and lower surfaces of a valve casing 203. Due to such construction, the simple piping shown in FIG. 24 becomes possible.

Since the inner structure of the valve casing 203 and the function of the water shutoff valve M' are substantially the same as those of the water shutoff valve M of the second embodiment, like parts are denoted by the same numerals with the addition of 100.

Also differing from the first embodiment, the axis of the water shutoff section C and the axis of the strainer N are not inclined but horizontal. Therefore, the inner structure of the valve casing 203 is considerably simplified and can be produced much more inexpensively than the water shutoff valve of the second embodiment.

We claim:

1. In a water supply tube which has one end connected to a mixing valve for mixing hot water and cold water, a device for preventing water hammer while regulating water pressure comprising:
   a) a communicating passage formed in a valve casing to communicate an upstream passage with a downstream passage,
   b) a valve element being reciprocable to open or close the communicating passage, and
   c) a valve element biasing means biasing said valve element in an opening direction, said valve element biasing means comprising a pressure adjusting spring with a small spring constant and a water hammer preventing spring with a large spring constant which are disposed in series in said valve casing, said valve element biasing means being capable of varying the opening area of said communicating passage so as to adjust the pressure in said communicating passage while preventing the occurrence of water hammer.

2. A device according to claim 1, further comprising:
   d) an auxiliary passage through which an amount of water which corresponds to a valve element movement volume is capable of flowing from said upstream passage to said downstream passage corresponding to the movement of said valve element in closing direction at the time of the occurrence of water hammer.

3. A device according to claim 1, wherein said valve element biasing means is capable of reciprocating said valve element substantially only in response to a downstream side valve pressing pressure which occurs in said downstream passage.

4. A device according to claim 2, wherein said valve element biasing means is capable of reciprocating said valve element substantially only in response to a downstream side valve pressing pressure which occurs in said downstream passage.

5. In a mixing valve for mixing hot water and cold water, a device for preventing water hammer while regulating water pressure comprising:
   a) a communicating passage formed in a valve casing to communicate an upstream passage with a downstream passage,
   b) a valve element being reciprocable to open or close the communicating passage, and
   c) a valve element biasing means biasing said valve element in an opening direction, said valve element biasing means comprising a pressure adjusting spring with a small spring constant and a water hammer preventing spring with a large spring constant which are disposed in series in said valve casing, said valve element biasing means being capable of varying the opening area of said communicating passage so as to adjust the pressure in said communicating passage while preventing the occurrence of water hammer.

6. A device according to claim 5, further comprising:
   d) an auxiliary passage through which an amount of water which corresponds to a valve element movement volume is capable of flowing from said upstream passage to said downstream passage corresponding to the movement of said valve element in closing direction at the time of the occurrence of water hammer.

7. A device according to claim 5, wherein said valve element biasing means is capable of reciprocating said valve element substantially only in response to a downstream side valve pressing pressure which occurs in said downstream passage.

8. A device according to claim 6, wherein said valve element biasing means is capable of reciprocating said valve element substantially only in response to a downstream side valve pressing pressure which occurs in said downstream passage.

9. In a water stop valve, a device for preventing water hammer while regulating water pressure comprising:
   a) a communicating passage formed in a valve casing to communicate an upstream passage with a downstream passage,
   b) a valve element being reciprocable to open or close the communicating passage, and
   c) a valve element biasing means biasing said valve element in an opening direction, said valve element biasing means comprising a pressure adjusting spring with a small spring constant and a water hammer preventing spring with a large spring constant which are disposed in series in said valve casing, said valve element biasing means being capable of varying the opening area of said communicating passage so as to adjust the pressure in said communicating passage while preventing the occurrence of water hammer.

10. A device according to claim 9, further comprising:
    d) an auxiliary passage through which an amount of water which corresponds to a valve element movement volume is capable of flowing from said upstream passage to said downstream passage corresponding to the movement of said valve element in closing direction at the time of the occurrence of water hammer.

11. A device according to claim 9, wherein said valve element biasing means is capable of reciprocating said valve element substantially only in response to a downstream side valve pressing pressure which occurs in said downstream passage.

12. A device according to claim 10, wherein said valve element biasing means is capable of reciprocating said valve element substantially only in response to a downstream side valve pressing pressure which occurs in said downstream passage.

13. Device for preventing water hammer while regulating water pressure comprising:
    a) a water hammer preventing device mounting sleeve having upper and lower end walls, said sleeve having an inlet opening and an outlet opening at angularly opposed positions at an upper portion thereof, the sleeve forming a communicating passage between said two openings, said inlet opening and outlet opening communicating with an upstream passage and downstream passage respectively,
    b) a plunger-like valve element being reciprocably disposed in the upper portion of said sleeve so as to vary an opening area of said communicating passage,
    c) a spring accommodating space defined between said lower end wall of said sleeve and said valve element, said valve element watertightly sealing said spring accommodating space from said communicating passage, and
    d) a valve element biasing means capable of biasing said valve element in an opening direction, said valve element biasing means being disposed in said spring accommodating space, said valve element biasing means comprising a pressure adjusting spring with a small spring constant and a water hammer preventing spring with a large spring constant which are disposed in series in said spring accommodating space, said valve element biasing means being capable of axially shifting said valve element thus to vary said opening area of said communicating passage so as to adjust the pressure in said communicating passage while preventing the occurrence of water hammer.

14. Device according to claim 13, further comprising:
    e) an auxiliary passage formed in said valve element through which an amount of water which corresponds to a valve element movement volume is capable of flowing from said upstream passage to said downstream passage corresponding to the movement of said valve element in closing direction at the time of the occurrence of water hammer.

15. Device according to claim 13, wherein said valve element biasing means is capable of reciprocating said valve element substantially only in response to a downstream side valve pressing pressure which occurs in said downstream passage.

16. Device according to claim 14, wherein said valve element biasing means is capable of reciprocating said valve element substantially only in response to a downstream side valve pressing pressure which occurs in said downstream passage.

17. In a water supply tube which has one end connected to a mixing valve for mixing hot water and cold water, a device according to claim 13.

18. In a water supply tube which has one end connected to a mixing valve for mixing hot water and cold water, a device according to claim 14.

19. In a water supply tube which has one end connected to a mixing valve for mixing hot water and cold water, a device according to claim 15.

20. In a water supply tube which has one end connected to a mixing valve for mixing hot water and cold water, a device according to claim 16.

21. In a mixing valve for mixing hot water and cold water, a device according to claim 13.

22. In a mixing valve for mixing hot water and cold water, a device according to claim 14.

23. In a mixing valve for mixing hot water and cold water, a device according to claim 15.

24. In a mixing valve for mixing hot water and cold water, a device according to claim 16.

25. In a water stop valve, a device according to claim 13.

26. In a water stop valve, a device according to claim 14.

27. In a water stop valve, a device according to claim 15.

28. In a water stop valve, a device according to claim 16.

* * * * *